United States Patent [19]
Beall et al.

[11] Patent Number: 4,920,081
[45] Date of Patent: Apr. 24, 1990

[54] $R_2O$-$AL_2O_3$/$B_2O_3$-$P_2O_5$ GLASSES

[75] Inventors: George H. Beall, Big Flats; Candace J. Quinn, Corning, both of N.Y.

[73] Assignee: Corning Incorporated, Corning, N.Y.

[21] Appl. No.: 258,674

[22] Filed: Oct. 17, 1988

[51] Int. Cl.$^5$ .................. C03C 3/16; C03C 3/17; C03C 3/19; C03C 3/21

[52] U.S. Cl. .................. 501/47; 501/44; 501/46; 501/48

[58] Field of Search .................. 501/44, 46, 47, 48, 501/73

[56] References Cited

U.S. PATENT DOCUMENTS

| | | | |
|---|---|---|---|
| 4,075,120 | 2/1978 | Myers et al. | 501/48 |
| 4,217,382 | 8/1980 | Toratani | 501/47 |
| 4,229,220 | 10/1980 | Hirota | 501/46 |

Primary Examiner—Mark L. Bell
Attorney, Agent, or Firm—C. S. Janes, Jr.

[57] ABSTRACT

This invention relates to the preparation of glasses exhibiting low transition temperatures with excellent chemical durability. The glasses consist essentially, in mole %, of:

| | | | | | |
|---|---|---|---|---|---|
| $P_2O_5$ | 44–58 | $Al_2O_3$ + $B_2O_3$ | 4–10 | $Na_2O$ + $Li_2O$ | 10–45 |
| $Al_2O_3$ | 0–7 | $Na_2O$ | 10–30 | $Cu_2O$ | 0–20 |
| $B_2O_3$ | 0–10 | $Li_2O$ | 0–30 | $Li_2O$ + $Cu_2O$ | 10–30 |

1 Claim, No Drawings

$R_2O$-$Al_2O_3$/$B_2O_3$-$P_2O_5$ GLASSES

RELATED APPLICATIONS

U.S. application Ser. No. 258,675, filed concurrently herewith by us under the title ZINC-CONTAINING PHOSPHATE GLASSES, discloses the formulation of glasses consisting essentially, in mole percent, of 10–35% $R_2O$, wherein $R_2O$ consists of at least two alkali metal oxides in the indicated proportions of 0–25% $Li_2O$, 0–25% $Na_2O$, and 0–25% $K_2O$, 12–55% ZnO, and 28–40% $P_2O_5$.

BACKGROUND OF THE INVENTION

It has long been recognized that the energy expended in forming an re-forming articles of inorganic glasses is a significant cost factor. Moreover, the requirement of higher shaping temperatures demands the use of glass contact surfaces prepared from materials exhibiting greater refractoriness, which materials are typically more expensive. Furthermore, where a glass is to be utilized as a sealant, its transition temperature or transformation temperature (Tg) must be lower than the components being sealed together in order to avoid thermal deformation of the latter. Therefore, there has been considerable research to develop sealing glasses demonstrating transition temperatures below 450° C., and preferably below 350° C.

Because glass compositions containing silica as the principal network former or glass former typically exhibit transition temperatures substantially in excess of 450° C., the search for glass compositions manifesting the desired low transition temperatures has customarily led to the use of $B_2O_3$ and/or $P_2O_5$ as the primary network forming component. U.S. Pat. No. 3,732,181 is illustrative of that practice. The patent discloses three broad areas of composition:

(1) PbO+$P_2O_5$ ≧ 95 mole %, wherein PbO constitutes 20–80 mole %;

(2) PbO+$R_2O$ (alkali metal oxides)+$P_2O_5$ ≧ 95 mole %, wherein PbO comprises 5–60 mole %, $R_2O$ constitutes 5–35 mole %, and $P_2O_5$ is present up to 85 mole %; and (3) PbO+$R_2O$+$B_2O_3$+$P_2O_5$ ≧ 95 mole %, wherein PbO comprises 5–30 mole %, $R_2O$ constitutes 5–30 mole %, $B_2O_3$ composes 5–20 mole %, and $P_2O_5$ comprises 15–85 mole %.

Although the above-cited composition ranges indicate the required presence of PbO, the patent asserts that part or all of the PbO may be replaced with divalent metal oxides.

Experience in the glass composition art has indicated that borate-based and phosphate-based glasses commonly demonstrate poorer chemical durability and resistance to attack by moisture than silica-based compositions, and that disadvantage becomes even more of a problem as the glasses are devised to manifest lower transition temperatures. For example, phosphate-based glasses demonstrating low transition temperatures are typically readily attacked by boiling water and, in not infrequent cases, exhibit hygroscopicity. As customarily defined, the transition temperature of a glass is the temperature at which increases in specific heat and thermal expansion coefficient take place which are accompanied by a sharp drop in viscosity.

Therefore, the principal objective of the present invention was to develop glasses exhibiting transition temperatures below 450° C., most preferably below 350° C., with working temperatures, i.e., temperatures at which the glass manifests a viscosity of about $10^4$–$10^7$ poises, below 500° C., most preferably between about 350°–450° C., which glasses display remarkable chemical durability when contacted with boiling water.

SUMMARY OF THE INVENTION

We have found that the above objective can be achieved in glasses having compositions within the sharply-delimited ranges of constituents set out below, expressed in terms of mole percent on the oxide basis:

| | | | |
|---|---|---|---|
| $P_2O_5$ | 44–58 | $Li_2O$ | 0–30 |
| $Al_2O_3$ | 0–7 | $Na_2O$ + $Li_2O$ | 10–45 |
| $B_2O_3$ | 0–10 | $Cu_2O$ | 0–20 |
| $Al_2O_3$ + $B_2O_3$ | 4–10 | $Li_2O$ + $Cu_2O$ | 10–30 |
| $Na_2O$ | 10–30 | | |

The presence of $Al_2O_3$ with, desirably, $B_2O_3$ enhances the chemical durability and improves the stability of the glass. Over 7 mole % $Al_2O_3$ or over 10 mole % $B_2O_3$, however, renders the glass too refractory. The inclusion of at least 5 mole % $Li_2O$ is preferred because $Na_2O$ alone appears to impact unfavorably upon the durability of the glass and/or renders the glass difficult to melt. The combination of $Li_2O$+$Cu_2O$ has the capacity for reducing the Tg of the glass while maintaining the desired exceptional chemical durability. $K_2O$ adversely affects the Tg such that the amount thereof must not exceed 5 mole %.

Up to 8% total, and preferably no more than 5% total, of at least one member of the group consisting of MgO, CaO, SrO, BaO, MnO, and ZnO may optionally be included. Larger concentrations hazard undue raising of the Tg of the glass and can adversely affect the chemical durability exhibited by the glass. Additions of up to 8%, commonly about 2–5%, $ZrO_2$ are useful in developing a glass manifesting a uniform white opacity. $SiO_2$ may be tolerated at levels up to about 3% fluoride in amounts up to about 5%. The sum of all optional additions to the base glass compositions will not exceed 15%, and in the preferred compositions the sum $P_2O_5$+$Al_2O_3$+$B_2O_3$+$Na_2O$+$Li_2O$+$Cu_2O$ will exceed 90%.

Although the complete conversion of composition intervals expressed in terms of mole percent to ranges expressed in terms of weight percent is not possible mathematically, the following ranges comprise approximate values of the operable composition intervals in terms of weight percent:

| | | | |
|---|---|---|---|
| $P_2O_5$ | 55–73 | $Li_2O$ | 0–8 |
| $Al_2O_3$ | 0–5 | $Na_2O$ + $Li_2O$ | 7–23 |
| $B_2O_3$ | 0–10 | $Cu_2O$ | 0–20 |
| $Al_2O_3$ + $B_2O_3$ | 1.75–10 | $Li_2O$ + $Cu_2O$ | 5–30 |
| $Na_2O$ | 7–15 | | |

Prior Art

U.S. Pat. No. 3,215,543 discloses the production of articles composed of mica particles entrained in a glassy matrix, that glass matrix consisting esentially, in mole %, of 6–20% RO, wherein RO consists of CaO, MgO, and/or ZnO, 22–42.5% $R_2O$, wherein $R_2O$ consists of the alkali metal oxides, 6−(16+(d/6))% $Al_2O_3$, and (36−(d/3))−(56−d)% $P_2O_5$, wherein d represents the percentage of RO. $Cu_2O$ is nowhere mentioned and, although there is literal overlap between the composition intervals of the patent and the ranges of the present inventive glasses, there is no reference made to the exceptional low Tg and high chemical durability exhibited by glasses within the ranges of the present inventive compositions and, also very importantly, none of the working examples of the patent had a composition coming within the parameters of the present inventive glasses.

U.S. Pat. No. 3,407,091 was concerned with preparing sealing glasses composed, in weight percent, of 4–27% $Na_2O$ and/or $K_2O$, 4–30% ZnO, 2–10% $Al_2O_3$, and 60–67% $P_2O_5$. In like manner to Patent No. 3,215,543, supra, $Cu_2O$ is nowhere mentioned; there is no recognition of the remarkably low Tg manifested by glasses of the present invention; and no working example of the patent falls within the ranges of the present inventive compositions.

U.S. Pat. No. 3,481,749 records compositions suitable for the production of glasses to be used, for example, as lubricants in the extrusion of metallic bodies at elevated temperatures. The glasses were required to be readily attacked by water to allow rapid elimination from the metallic body during washing in water. The glasses consisted essentially, in mole %, of 9–33% $R_2O$, 16–20% BaO, CaO, MgO, PbO, and/or ZnO, 10–20% $Al_2O_3$, and 29–61% $P_2O_5$. The concentrations of $Al_2O_3$ and the recited divalent metal oxides are outside the operable ranges of the present invention.

U.S. Pat. No. 3,732,181 was discussed in some detail above. $Al_2O_3$ was nowhere asserted to be a glass component and high quantities of PbO are required, so, self-evidently, all of the working examples recorded therein are outside of the operable composition intervals of the present invention.

U.S. Pat. No. 3,885,973 presents glasses exhibiting low transformation temperatures, but relatively high solution rates in water, consisting essentially, in mole %, of 5–25% $Li_2O$, 5–30% ZnO, 58–76% $P_2O_5$, and 0–10% alkaline earth metal oxides. No references are made to $Na_2O$, $Al_2O_3$, or $B_2O_3$.

U.S. Pat. No. 3,926,649 discloses glasses demonstrating a low Tg, but also a relatively high rate of solution in water, consisting essentially, in mole %, of 75±2.5% $P_2O_5+B_2O_3$ and 25±2.5% alkali metal oxides+alkaline earth metal oxides+ZnO. $Al_2O_3$ and $Cu_2O$ are nowhere mentioned and none of the working examples had a composition coming within the ranges of the present invention.

U.S. Pat. No. 3,935,018 describes the preparation of glasses displaying a low Tg, but, again, a relatively high rate of solution in water, consisting essentially, in mole %, of 0–30% PbO, 1.2–3.5% $B_2O_3$, 50–72% $P_2O_5$, 0–5% transition metal oxides, and the remainder consisting of alkali metal oxides, alkaline earth metal oxides, and ZnO. $Al_2O_3$ is not mentioned and none of the working examples has a composition which is operable in the present invention.

U.S. Pat. No. 3,964,919 is drawn to glasses manifesting a low Tg, but, yet again, a relatively high rate of solution in water, consisting essentially, in mole % of 50–75% $P_2O_5$, 0.1–10% of at least one member of the group of up to 1.6% $CrO_3$, up to 7% $MoO_3$, and up to 7% $WO_3$, and 15–49.9% of at least one oxide of the group of alkali metal oxides and alkaline earth metal oxides, and which may contain up to 5% by weight $H_2O$. The maximum of 2% total of $Al_2O_3+B_2O_3$ as optional components places those compositions outside of the ranges required in the instant invention.

U.S. Pat. No. 3,979,322 is directed to glasses suitable for use in laser applications consisting essentially, in mole %, of 1–30% alkali metal oxides, 20–45% alkaline earth metal oxides and/or ZnO, 0–27% PbO, $B_2O_3$, $Al_2O_3$, and/or $Nb_2O_5$, 0.1–25% $Nd_2O_3$, and 35–49% $P_2O_5$. The level of divalent metal oxide is far in excess of that operable in the present invention.

U.S. Pat. No. 3,989,532 is drawn to glasses manifesting a low Tg, but also hygroscopicity, consisting essentially, in mole %, of 0–2% $Al_2O_3$ and/or $SiO_2$, 1.2–3.5% $B_2O_3$, 2.7–20% alkaline earth metal oxides, ≧5% alkali metal oxides, and ≧52% $P_2O_5$. The hygroscopic behavior exhibited by the glasses would render them unsuitable in the present invention. None of the working examples had a composition coming within the ranges of the instant invention.

U.S. Pat. No. 4,026,714 was concerned with the production of glasses demonstrating a low Tg with hygroscopic behavior consisting essentially, in mole %, of 4–30% alkali metal oxides, alkaline earth metal oxides, and/or ZnO, 1–12% PbO, 3.5–12% $Al_2O_3$, $B_2O_3$, and/or $SiO_2$, and 52–72% $P_2O_5$. None of the working examples comes within the composition intervals of the present invention.

U.S. Pat. No. 4,046,540 is directed to the preparation of glasses displaying a low Tg and being capable of injection molding. Operable ranges of glasses consisted essentially, in mole %, of 12–20% $Na_2O$, 4–6% PbO, 1.2–3.5% $B_2O_3$, 58–65% $P_2O_5$, and the remainder consisting of $Li_2O$, CaO, and/or MgO. No reference is made to $Al_2O_3$ or $Cu_2O$, the $P_2O_5$ content exceeds that operable in the present invention, and all of the working examples are outside of the composition intervals of the instant invention.

U.S. Pat. No. 4,060,422 discusses sealing glasses for laser applications consisting essentially, in mole %, of 4–12% $Li_2O$, 5–25% PbO, 15–35% ZnO, 1–4% $Al_2O_3$, 2–10% $V_2O_5$, and 45–65% $P_2O_5$. The divalent metal oxide content far exceeds that which can be tolerated in the present invention.

U.S. Pat. No. 4,075,120 records glasses suitable for use in laser applications consisting essentially, in mole %, of 5–40% alkali metal oxides, 5–30% alkaline earth metal oxides, 0.01–15% $R_2O_3$, wherein $R_2O_3$ is selected from the group consisting of $Al_2O_3$, $La_2O_3$, $Y_2O_3$, $Tm_2O_3$, $B_2O_3$, $Er_2O_3$, and mixtures thereof, 35–65% $P_2O_5$, and 0.01–7% $Nd_2O_3$. The alkaline earth metal oxides are required constituents and none of the working examples (exclusive of the presence of $Nd_2O_3$) had a composition coming within the ranges found to be operable in the instant invention.

U.S. Pat. No. 4,229,220 is drawn to glasses suitable for coating glass laser discs consisting essentially, in mole %, of 0–20% $Li_2O$, 0–17% $Na_2O$, 8–20% $Li_2O+Na_2O$, 7–28% CuO, 4–10% $Al_2O_3$, 51–59% $P_2O_5$, 0–8% $B_2O_3$, 0–23% ZnO, 0–15% BaO, and 0–13% $V_2O_5$. None of the working examples has a composition coming within the ranges of the present invention.

U.S. Pat. No. 4,239,645 discloses glasses suitable for use in laser applications consisting essentially in mole %, of 10–25% $R_2O$, wherein $R_2$ consists of 0–25% $Li_2O$, 0–25% $Na_2O$, and 0–8% $K_2O$, 5–15% RO, wherein RO consists of 0–15% MgO, 0–15% CaO, 0–15% SrO, 0–15% BaO, and 0–15% ZnO, 1–15% $Al_2O_3$, 55–70% $P_2O_5$, and 0.01–5% $Nd_2O_3$. None of the working examples (exclusive of $Nd_2O_3$) comes within the composition intervals of the instant invention.

U.S. Pat. No. 4,248,732 refers to glasses operable in laser applications consisting generally, in mole %, of 5-40% alkali metal oxides, 5-30% RO, wherein RO is at least one oxide of the group BaO, BeO, CaO, MgO, SrO, and ZnO, 0.01-15% $R_2O_3$, wherein $R_2O_3$ is at least one oxide of the group $Al_2O_3$, $B_2O_3$, $Er_2O_3$, $La_2O_3$, $Tm_2O_3$, and $Y_2O_3$, 0.01-7% $Nd_2O_3$, 35-65% $P_2O_5$, and 0.1-10% by weight of a solarization inhibiting oxide of the group $CeO_2$, $Nb_2O_5$, $Sb_2O_3$, $SiO_2$, and $TiO_2$. None of the working examples (exclusive of $Nd_2O_3$ and the solarization inhibitor) had a composition coming within the ranges of the present invention.

U.S. Pat. No. 4,391,915 reports glasses suitable for use in pressing optical components consisting essentially, in weight %, of 0-3% $Li_2O$, 5-20% $K_2O$, 8-15% BaO, 4.5-9% ZnO, 0-6% MgO, 0-18% PbO, 3.5-9% $Al_2O_3$, 0-3% $B_2O_3$, 0-1% $SiO_1$, 0-3% $B_2O_3$, and 45-55% $P_2O_5$. The total content of divalent metal oxides is greater than desired in the glasses of the instant invention; the use of high concentrations of $K_2O$ is not desired; and none of the working examples was within the composition intervals of the instant invention.

U.S. Pat. No. 4,439,530 refers to optical glasses basically consisting essentially, in weight percent, of 3-30% $R_2O$, wherein $R_2O$ consists of 0-30% $Na_2O$ and/or $K_2O$, 8-65% PbO, 18-38% $P_2O_5$, and 1-45% $Ta_2O_5$. A large number of optional ingredients may be present in various amounts including 0-3% $Al_2O_3$ and 0-15% $B_2O_3$. The $P_2O_5$ level is much lower than is required in the present invention.

U.S. Pat. No. 4,544,974 reports glasses suitable for bonding metals or metal oxides into a composite structure. The glasses consisted essentially, in mole %, of 10-40% alkali metal oxide or alkaline earth metal oxide, 0-25% CuO or ZnO, 5-15% $Al_2O_3$, 0-25% $B_2O_3$, 0-30% $SiO_2$, and 10-35% $P_2O_5$. The $P_2O_5$ content is much lower than is required in the present invention.

"Oxide Glasses of Very Low Softening Point. Parts 1 and 2. Preparation and Properties of Some Lead Phosphate Glasses," N. H. Ray et al., *Glass Technology* 14, No. 2, pages 50-59, April 1973, provides an extensive review of phosphate-based glasses but none of the compositions recorded there came within the ranges of the present invention.

DESCRIPTION OF PREFERRED EMBODIMENTS

Table I reports a number of glass compositions, expressed in terms of mole percent on the oxide basis, illustrative of the inventive glasses. Table IA lists the same compositions, but wherein the values of the individual constituents have been converted to weight percent. Inasmuch as it is not known with which cation it is combined and because the amount included is relatively small, the fluoride content is merely recorded in percent in addition to the base glass. The actual batch ingredients for preparing the glasses can comprise any materials, either the oxides or other compounds, which, when melted together, will be transformed into the desired oxide in the proper proportions. For example, $Li_2CO_3$ can conveniently be utilized as the source of $Li_2O$.

The batch ingredients were compounded, ballmilled together to assist in producing a homogeneous melt, and thereafter charged into silica crucibles. After placing lids thereon, the crucibles were introduced into a furnace operating at about 1000° C. and held at that temperature for about 3 hours. Each melt was then poured into a steel mold to yield a rectangular glass slab with dimensions of about 8"×4"×0.5" and that slab was annealed overnight at 300° C.

Rectangular tab-shaped pieces weighing about 30-40 grams were cut from the slabs and heat treated in cups of aluminum foil to temperatures within the range of 350°-425° C., and glass cane was handdrawn from each cup to obtain a close approximation of the working temperature of the glass.

Although the above description involved laboratory melting and forming techniques only, it will be appreciated that the compositions reported in the Tables below are capable of being melted in large scale melting units and shaped into bodies of desired geometries employing techniques conventional in the commercial glassmaking art.

TABLE I

| (Mole %) | | | | | | |
|---|---|---|---|---|---|---|
| | 1 | 2 | 3 | 4 | 5 | 6 |
| $P_2O_5$ | 56 | 45 | 45 | 41 | 47 | 47 |
| $B_2O_3$ | — | 7 | 7 | 9 | 5 | 2 |
| $Al_2O_3$ | 4 | 2 | 2 | — | 2 | 5 |
| $Na_2O$ | 14 | 19 | 15 | 17 | 21 | 17 |
| $Li_2O$ | 14 | 19 | 15 | 17 | 21 | 17 |
| $Cu_2O$ | 12 | — | 12 | 12 | — | 12 |
| CaO | — | 8 | 4 | 4 | 4 | — |
| | 7 | 8 | 9 | 10 | 11 | 12 |
| $P_2O_5$ | 57 | 48 | 48.0 | 47.0 | 47 | 47 |
| $B_2O_3$ | — | 5 | 5.0 | 5.0 | 5 | 5 |
| $Al_2O_3$ | 4 | 3 | 4.5 | 3.5 | 3 | 2 |
| $Na_2O$ | 24 | 20 | 20.0 | 21.0 | 16 | 21.5 |
| $Li_2O$ | — | 20 | 20.0 | 21.0 | 16 | 21.5 |
| $Cu_2O$ | 10 | — | — | — | 10 | 3 |
| CaO | 5 | 4 | 4.0 | 2.0 | 4 | — |
| MgO | | — | — | 2.0 | — | — |
| $F_2$ | — | — | 4.5 | 4.5 | — | — |
| | 13 | 14 | 15 | 16 | 17 | |
| $P_2O_5$ | 56 | 55 | 46 | 57 | 42 | |
| $B_2O_3$ | — | — | — | 1 | 10 | |
| $Al_2O_3$ | 3 | 3.7 | 4 | 1 | 2 | |
| $Na_2O$ | 18.5 | 13.8 | 25 | 20 | 46 | |
| $Li_2O$ | 18.5 | 13.7 | 25 | 20 | — | |
| $Cu_2O$ | 4 | — | — | — | — | |
| $K_2O$ | — | 5.5 | — | — | — | |
| $F_2$ | — | 5.5 | — | — | — | |
| $SiO_2$ | — | — | — | 1 | — | |
| $ZrO_2$ | — | 2.8 | — | — | — | |

TABLE IA

| (Weight %) | | | | | | |
|---|---|---|---|---|---|---|
| | 1 | 2 | 3 | 4 | 5 | 6 |
| $P_2O_5$ | 70.0 | 68.9 | 61.4 | 58.5 | 71.2 | 63.5 |
| $B_2O_3$ | — | 5.3 | 4.7 | 6.3 | 3.7 | 1.9 |
| $Al_2O_3$ | 3.6 | 2.2 | 1.9 | — | 2.1 | 3.3 |
| $Na_2O$ | 7.6 | 12.7 | 8.9 | 10.6 | 13.9 | 10.0 |
| $Li_2O$ | 3.7 | 6.1 | 4.3 | 5.1 | 6.7 | 4.9 |
| $Cu_2O$ | 15.1 | — | 16.5 | 17.3 | — | 16.4 |
| CaO | — | 4.8 | 2.1 | 2.2 | 2.3 | — |
| | 7 | 8 | 9 | 10 | 11 | 12 |
| $P_2O_5$ | 69.1 | 71.5 | 69.7 | 69.6 | 64.2 | 70.5 |
| $B_2O_3$ | — | 3.7 | 3.6 | 3.6 | 3.4 | 3.7 |
| $Al_2O_3$ | 3.5 | 3.2 | 4.8 | 3.9 | 2.8 | 2.1 |
| $Na_2O$ | 12.7 | 6.3 | 6.2 | 6.6 | 4.6 | 14.1 |
| $Li_2O$ | — | 13.0 | 12.7 | 13.6 | 9.5 | 7.8 |
| $Cu_2O$ | 12.2 | — | — | — | 13.8 | — |
| CaO | 2.4 | 2.3 | 2.2 | 1.1 | 2.1 | 1.8 |
| MgO | — | — | — | 0.8 | — | — |
| $F_2$ | — | — | 1.8 | 1.8 | — | — |
| | 13 | 14 | 15 | 16 | 17 | |

TABLE IA-continued

| | | | (Weight %) | | |
|---|---|---|---|---|---|
| P$_2$O$_5$ | 75.4 | 74.2 | 70.7 | 79.6 | 61.4 |
| B$_2$O$_3$ | — | — | — | 0.7 | 7.2 |
| Al$_2$O$_3$ | 2.8 | 3.6 | 4.4 | 1.0 | 2.1 |
| Na$_2$O | 10.9 | 8.1 | 16.8 | 12.2 | 29.3 |
| Li$_2$O | 5.3 | 3.9 | 8.1 | 5.9 | — |
| Cu$_2$O | 5.4 | — | — | — | — |
| K$_2$O | — | 4.9 | — | — | — |
| F$_2$ | — | 2.0 | — | — | — |
| SiO$_2$ | — | — | — | 0.6 | — |
| ZrO$_2$ | — | 3.3 | — | — | — |

Samples having the approximate dimensions of 35×25×15 mm were cut from each glass slab and then ground and polished for testing the chemical durability thereof. In one test each sample was accurately weighed and thereafter immersed into a bath of boiling water. After a residence time of one hour the sample was withdrawn from the bath, dried in the ambient environment, and then weighed to deterine any loss of weight in the sample. In a second test each sample was accurately weighed and then immersed into a bath operating at 75° C. consisting of a 0.3% by weight aqueous solution of SUPER SOILAX detergent marketed by Economics Laboratories, St. Paul, Minn., the solution exhibiting a pH of about 10. After a dwell period of 24 hours the sample was removed from the bath, dried in the ambient environment, and reweighed to measure any weight loss. The Tg of each glass was measured employing differential scanning calorimetry techniques standard in the glass art.

Table II records the color (COLOR) of the glass before any testing, the percent weight loss in the boiling water test (H$_2$O), the percent weight loss in the SUPER SOILAX test (SUPER), the Tg of the glass in °C., and the working temperature of the glass in °C. as determined by pulling cane (PULL).

TABLE II

| | 1 | 2 | 3 | 4 | 5 | 6 |
|---|---|---|---|---|---|---|
| COLOR | Brown | Clear | Black | Black | Clear | Black |
| H$_2$O | 0.07 | 0.2 | 0.03 | 0.06 | 0.15 | 0.00 |
| SUPER | 1.2 | — | — | — | — | — |
| Tg | 300 | — | 295 | — | — | — |
| PULL | — | 425 | 400 | 425 | 375 | 375 |

| | 7 | 8 | 9 | 10 | 11 | 12 |
|---|---|---|---|---|---|---|
| COLOR | Black | Clear | Clear | Clear | Black | Clear |
| H$_2$O | 0.09 | 0.06 | 0.00 | 0.00 | 0.00 | — |
| SUPER | — | — | — | 4.2 | 1.1 | 7.1 |
| Tg | — | 325 | 335 | — | — | 313 |
| PULL | 425 | 400 | 425 | 400 | 400 | 400 |

| | 13 | 14 | 15 | 16 | 17 |
|---|---|---|---|---|---|
| COLOR | Clear | White Opal | Clear | Clear | Clear |
| H$_2$O | — | 0.12 | 5.0 | Hygroscopic | 6.5 |
| SUPER | 3.3 | — | 5.6 | — | Dissolved |
| Tg | 292 | — | 290 | — | — |
| PULL | 375 | — | 375 | — | 450 |

The measures of resistance to attack by water and alkalies exhibited by Examples 1–14, while not equivalent to those demonstrated by the glass compositions encompassed within our companion application, Ser. No. 07/258,875, are exceptional for phosphate-based compositions. The dramatic reduction in this resistance which takes place in glass compositions only slightly outside the sharply delimited ranges of the present inventive glasses is readily observed in Examples 15–17. Thus, in Example 15 the sum of Li$_2$O+Na$_2$O exceeds the maximum permitted. Example 16 illustrates that insufficient Al$_2$O$_3$ and/or B$_2$O$_3$ results in a glass that is hygroscopic and which becomes sticky or tacky when cooled in a humid atmosphere. Example 17 demonstrates the need for a combination of Li$_2$O and Na$_2$O, rather than one alone, to assure that the desired resistance to attack by water and alkalies is secured.

This high resistance to attack by moisture has recommended the use of the inventive glasses in a wide range of applications including, for example, electronic devices, optical and ophthalmic lenses, and coatings for optical waveguides. Furthermore, because the viscosity relationships exhibited by the inventive glasses at relatively low working temperatures render them capable of being shaped into articles of complex configurations through extrusion, injection molding, and other techniques conventionally employed in the plastic forming art, the range of products for which the inventive glass-ceramics are useful is greatly broadened.

We claim:

1. A glass exhibiting a transition temperature below 350° C., a working temperature below 450° C., and excellent resistance to attack by water and mild aqueous alkaline solutions, said glass consisting essentially, expressed in terms of mole percent on the oxide basis, of:

| | | | |
|---|---|---|---|
| P$_2$O$_5$ | 41–57 | Li$_2$O | 0–21 |
| Al$_2$O$_3$ | 0–5 | Na$_2$O + Li$_2$O | 13.8–43 |
| B$_2$O$_3$ | 0–9 | Cu$_2$O | 0–12 |
| Al$_2$O$_3$ + B$_2$O$_3$ | 3–9.5 | Li$_2$O + Cu$_2$O | 10–29 |
| Na$_2$O | 15–24 | ZrO$_2$ | 0–2.8 |
| CaO | 0–8 | F$_2$ | 0–5.5 |
| MgO | 0–2 | K$_2$O | 0–5.5 |
| P$_2$O$_5$ + Al$_2$O$_3$ + B$_2$O$_3$ + Na$_2$O + Li$_2$O + Cu$_2$O >90 .— | | | |

* * * * *